(No Model.)
W. H. SNYDER & A. O. FRICK.
TRACTION ENGINE.
No. 275,279. Patented Apr. 3, 1883.
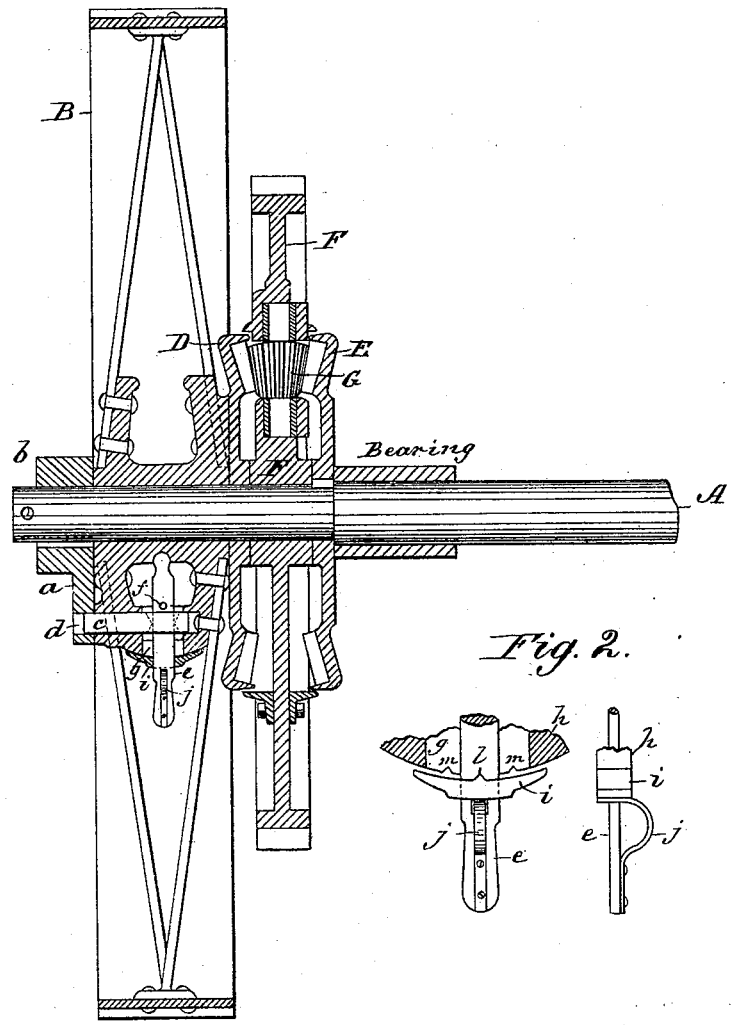

UNITED STATES PATENT OFFICE.

WILLIAM H. SNYDER AND ABRAHAM O. FRICK, OF WAYNESBOROUGH, PA.

TRACTION-ENGINE.

SPECIFICATION forming part of Letters Patent No. 275,279, dated April 3, 1883.

Application filed January 25, 1883. (No model.)

*To all whom it may concern:*

Be it known that we, WILLIAM H. SNYDER and ABRAHAM O. FRICK, of Waynesborough, in the county of Franklin and State of Pennsylvania, have invented a new and useful Improvement in Locking-Gear for Traction-Engines; and we do hereby declare that the following is a full, clear, and exact description of the same, reference being had to the accompanying drawings, forming part of this specification, in which—

Figure 1 is a vertical section through one of the main traction-wheels, the compensating-gear, and locking mechanism on the main axle; and Fig. 2 shows a sectional and side view in detail of the means for holding the locking-bolt to its adjustment.

In traction-engines it is desirable to have the two main-wheels driven independently, so that the inner wheel in turning a curve may be stationary, or nearly so, while the outer wheel is rounding the larger curve, and for this purpose it is customary to employ a compensating-gear consisting of two bevel-wheels on the axle, facing each other, one of which is connected to one of the main wheels, and the other of which is connected to the axle which is rigid with the other main wheel, and between which bevel-wheels is arranged a loose gear-wheel receiving motion from the engine and bearing bevel-pinions which mesh with the bevel-wheels on each side of the same. With this construction of compensating-gear it sometimes happens that one main wheel will get in a mud-hole or upon a sandy or soft foundation while the other wheel is on hard ground. In such case the wheel that is on hard ground will become stationary, and the wheel which is on soft ground will spin around at high velocity, all the power of the engine being lost in the movement of this wheel.

The object of our invention is to prevent this contingency; and to this end it consists in a peculiar construction of device whereby the loose wheel is rigidly locked to the axle, so that in such case the power of the engine cannot become diverted to one wheel, but both wheels are rotated together, and the wheel which is on hard ground is made effective for drawing the engine out.

In the drawings, A represents the main axle, and B is one of the traction-wheels, which is loose on said axle, the other traction-wheel, which is not shown, being rigid with the axle.

D E F G is the compensating-gear, of a well-known form, of which D E are two bevel-wheels facing each other, and of which D is loose on the axle and connected to the main wheel B, while E is rigidly connected to the axle by a key, and is consequently also rigidly connected to the other main wheel, which is rigid on the axle. F is an intermediate gear-wheel which derives motion from the engine, and carries bevel-pinions G, by which motion is imparted to either or both of the bevel-wheels D and E. Thus when the engine is going straight ahead the revolution of wheel F imparts motion through its pinion G equally to both the bevel-wheels D and E, and consequently to both main or traction wheels. In turning, however, the bevel-wheel next to the inner or nearly stationary wheel stands still, or nearly so, while the pinion G traverses its teeth and imparts a correspondingly faster movement to the other wheel. Now, for instance, if the loose traction-wheel B should get into a soft place, where it can exert little or no traction, and the other wheel, which is rigid on the axle, should be upon solid ground, then the whole power of the engine would run out, so to speak, through the wheel B, for the other wheel and axle would stand still and the pinion G of wheel F would traverse the teeth of the now stationary bevel-wheel E and would impart double the speed to bevel-wheel D and the main traction-wheel B, because bevel-wheel D would then have the motion derived from wheel F, and also the motion derived from the secondary rotation of pinion G as it traversed the cogs of the other bevel-wheel. To remedy this difficulty we have provided means for locking both main traction-wheels together, and thus in special emergencies, as mentioned, to preclude this objectionable incident of the compensating-gear. To do this we form an arm, $a$, on the cap $b$, which holds the main wheel B on the axle, which arm and cap are rigidly connected to the axle by a key or bolt. In the hub H of the main wheel B is arranged a sliding bolt, $c$, which is adapted to be projected into a hole, $d$, in the arm, or simply to bear against the arm $a$, so as to lock the main wheel rigidly to the axle and also to the other main wheel. When this adjustment is made it will be seen that even if one wheel gets into a soft place the other wheel, which is on a solid foundation, is bound to rotate and drag the engine out.

For operating the bolt a slot is made through the same and a lever, $e$, extends through the slot, and is fulcrumed at its end in a seat or recess in the hub, being kept in place against slipping out by a pin, $f$, just behind the bolt. To exclude dirt, the hub at this point is cored out and only a slot, $g$, left in the part $h$ of the hub, through which the lever extends, and this slot is covered by a curved sliding cap, $i$, that moves with the lever and is backed by a spring, $j$, the adjustments of the lever being fixed by a toe, $l$, on said cap, that enters one of the notches $m$ of the hub.

In the drawings we have, for simplicity, shown the bevel-wheels D and E rigidly connected to the parts which they actuate; but it is to be understood that springs may be interposed between the said wheels and the parts which they actuate for the purpose of rendering the strain elastic.

Having thus described our invention, what we claim as new is—

1. The combination of the axle A, having arm $a$, the loose wheel B, having bolt $c$ and lever $e$, and the compensating mechanism D E F G, substantially as shown and described.

2. The combination, with the axle A, having arm $a$, of the wheel B, having cored and notched hub $h$, with slot $g$, the bolt $c$, and lever $e$, having spring-seated cap $i$, with projection $m$, substantially as shown and described.

WILLIAM H. SNYDER.
ABRAHAM O. FRICK.

Witnesses:
D. M. GOOD, Jr.,
FRED. FRICK.